United States Patent
Sim et al.

(10) Patent No.: US 8,503,778 B2
(45) Date of Patent: Aug. 6, 2013

(54) ENHANCING PHOTOGRAPH VISUAL QUALITY USING TEXTURE AND CONTRAST DATA FROM NEAR INFRA-RED IMAGES

(75) Inventors: Terence Mong Cheng Sim, Singapore (SG); Xiaopeng Zhang, Richmond Hill (CA)

(73) Assignee: National University of Singapore, Singapore (SG)

( * ) Notice: Subject to any disclaimer, the term of this patent is extended or adjusted under 35 U.S.C. 154(b) by 444 days.

(21) Appl. No.: 12/779,219

(22) Filed: May 13, 2010

(65) Prior Publication Data
US 2010/0290703 A1 Nov. 18, 2010

Related U.S. Application Data

(60) Provisional application No. 61/216,372, filed on May 14, 2009.

(51) Int. Cl.
*G06K 9/00* (2006.01)
(52) U.S. Cl.
USPC ........................................................ 382/172
(58) Field of Classification Search
USPC ................................. 382/179, 172
See application file for complete search history.

(56) References Cited

U.S. PATENT DOCUMENTS

2010/0100275 A1* 4/2010 Mian et al. .................... 701/29

OTHER PUBLICATIONS

Xiaopeng Zhang; Sim, T.; Xiaoping Miao; , "Enhancing photographs with Near Infra-Red images," Computer Vision and Pattern Recognition, 2008. CVPR 2008. IEEE Conference on , vol., No., pp. 1-8, Jun. 23-28, 2008 doi: 10.1109/CVPR.2008.4587825.*
6.C. Fredembach, N. Barbuscia, and S. Süsstrunk, "Combining visible and near-infrared images for realistic skin smoothing," in Proc. IS&T/SID 17th Color Imaging Conference, Albuquerque, NM, 2009.*

* cited by examiner

*Primary Examiner* — Nirav G Patel
(74) *Attorney, Agent, or Firm* — Fenwick & West LLP

(57) ABSTRACT

Near infra-red images of natural scenes usually have better contrast and contain rich texture details that may not be perceived in visible light photographs. The contrast and rich texture details form a NIR image corresponding to a visible light image are useful for enhancing the visual quality of the visible light image. To enhance the visual quality of a visible light image using its corresponding near infra-red image, a computer-implemented method computes a weight region mask from the visible light image, transfers contrast data and texture data from the near infra-red image to the visible light image guided by the weighted region mask. The contrast data is computed from the low frequency subbands of the visible light image and corresponding infra-red image after a wavelet transform by matching the histogram of gradient magnitude. The texture data is computed from the high frequency subbands of both images after wavelet transform.

31 Claims, 6 Drawing Sheets

ENHANCING PHOTOGRAPH VISUAL QUALITY USING TEXTURE AND CONTRAST DATA FROM NEAR INFRA-RED IMAGES

CROSS REFERENCE TO RELATED APPLICATIONS

This application claims the benefit of U.S. Provisional Application No. 61/216,372, filed May 14, 2009, entitled "Method to Enhance Photographs by Transferring Texture and Contrast from Near Infrared (NIR) Images," which is incorporated by reference in its entirety.

BACKGROUND

1. Field of the Invention

This invention relates to computational photography, and in particular to enhancing visible photograph visual quality using corresponding near infra-red images.

2. Background of the Invention

The radiance from natural scenes usually spans a very wide dynamic range, far exceeding what a digital camera can capture. For instance, in a sunny outdoor environment, the dynamic range could reach as high as $10^9$. In contrast, a professional-grade digital camera that uses 14 bits per color channel can capture a limited dynamic range of only $10^4$. Consumer-grade cameras are even worse. There is no single exposure in cameras that can capture all the details in the brightest and darkest regions simultaneously. As a result, images/photographs of a scene captured by a digital camera omit a lot of scene details. By comparison, human eyes have a much higher dynamic range than a camera, and can perceive much more scene details omitted by a digital camera.

One conventional solution to this problem is tone mapping, which computes a high dynamic range (HDR) image, usually from multiple shots of varying exposures, and then maps the HDR image into a lower dynamic range (LDR) image suitable for display devices. However, this tone mapping technique does not usually produce a perceptually pleasing result. Usually, pixels end up becoming too bright or too dark, and rich scene information such as color and texture are almost completely lost. Furthermore, conventional tone mapping techniques require obtaining an HDR image from multiple images captured with different exposures. This HDR image requirement limits the tone mapping technique to static scenes, which greatly reduces its usefulness in everyday photography.

Another conventional solution widely used by professional photographers is to take photos in raw format and manually adjust contrast region by region. Usually raw pictures use 12 or 14 bits per color channel to record scene radiance, thus resulting in a higher dynamic range than normal Joint Photographic Experts Group (JPEG) photos. Such manual adjustment is tedious and requires experience, and the dynamic range of raw format is still very limited compared to the dynamic range human eyes can perceive.

Near Infra-Red (NIR) light lies between visible red light and Long Infra-Red (LIR) light in the electromagnetic spectrum. NIR light has a wavelength in the range 750-1400 nm, which is longer than visible light (380-750 nm). Human eyes cannot see NIR light but most digital cameras can sense it very well. NIR images of natural scenes usually have better contrast and contain rich texture details that may not be perceived in visible light photographs. Although NIR can be recorded by CCD or CMOS sensors, most manufacturers of digital cameras install an infra-red (IR) cutoff filter over the sensor to suppress infra-red light and avoid unwanted artifacts. NIR photography is commonly appreciated for its artistic value, but has not been fully exploited in computational photography. The contrast and rich texture details from a corresponding NIR image of a visible light image are useful for the visible light image quality enhancement.

SUMMARY OF THE INVENTION

According to an embodiment of the invention, a computer-implemented method is provided for enhancing the visual quality of a visible light image using its corresponding near infra-red image. In one embodiment, enhancing the visual quality of the visible light image comprises computing a weighted region mask from the visible light image, transferring contrast data and texture data from the near infra-red image to the visible light image based on the weighted region mask. The weighted region mask of the visible light image indicates the areas of the visible light image to be enhanced and the extent of enhancement. The invention takes the wavelet transform of the visible light image and its corresponding infra-red image, obtains the large scale layers of the low frequency subbands using bilateral filtering, and matches the histograms of their gradient magnitudes. This effectively transfers the contrast data from the near infra-red image to the visible light image. To transfer the texture data, the high frequency subbands of both images are alpha-blended together. From the contrast transferred subband and the texture transferred subbands, the invention generates an enhanced visible light image with improved visual quality.

The figures depict various embodiments of the invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
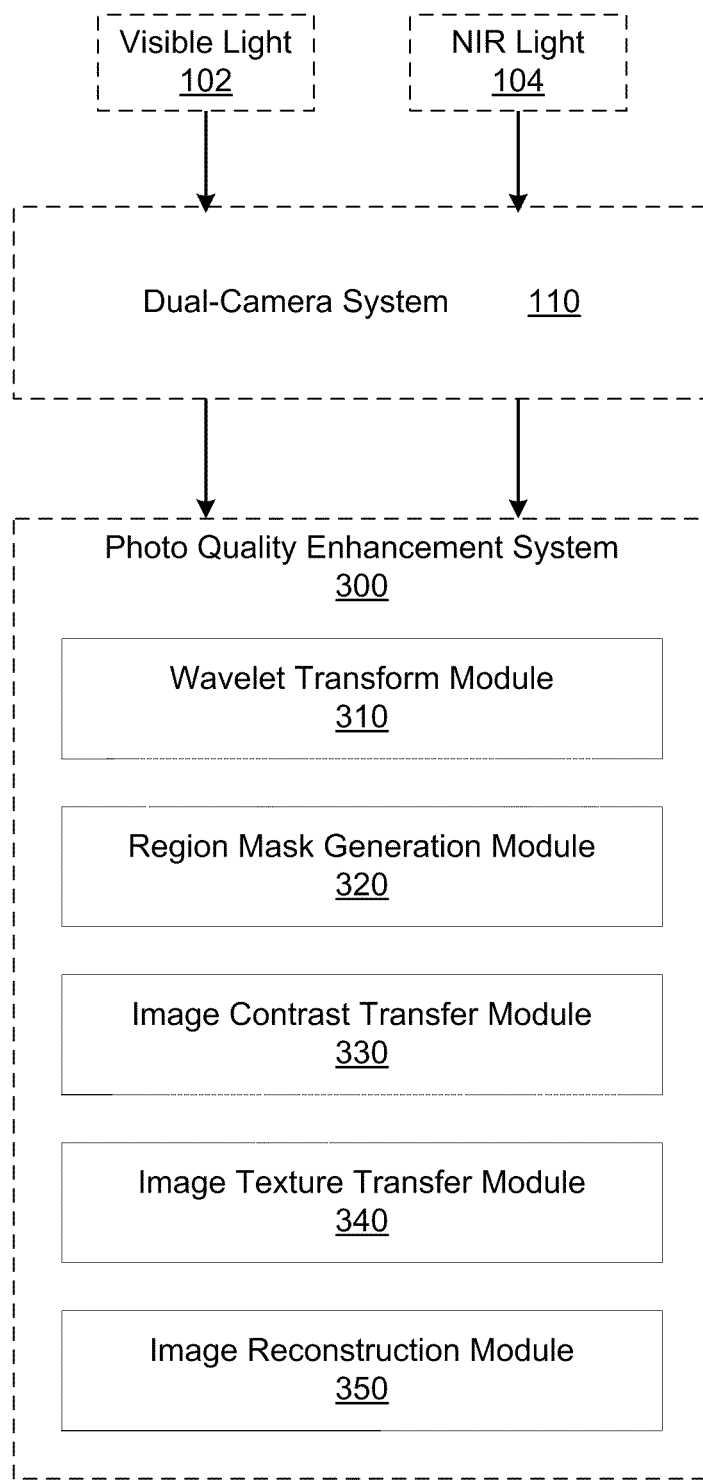
FIG. 1 shows a block diagram of a dual-camera system and a photo quality enhancement system.

Referring to FIG. 1 for purposes of explanation, the invention provides a dual-camera system 110 to capture a visible light image (VIS) and a corresponding NIR image of the same scene simultaneously, and a photo quality enhancement system 300 to enhance the visual quality of the visible light image using the contrast and rich texture details of the corresponding NIR image. Given as input one VIS image and its corresponding NIR image captured by the dual-camera system 110, the photo quality enhancement system 300 can adaptively detect visually unsatisfactory pixels (e.g., too dark or too light) in the VIS image, and transfer contrast information and high frequency texture from its NIR counterpart to enhance the visual quality of the VIS image. The dual-camera system 110 is further described with reference to FIG. 2A and FIG. 2B. The photo quality enhancement system 300 is further described with reference to FIGS. 3A-3B and 4.

Figure 2A:
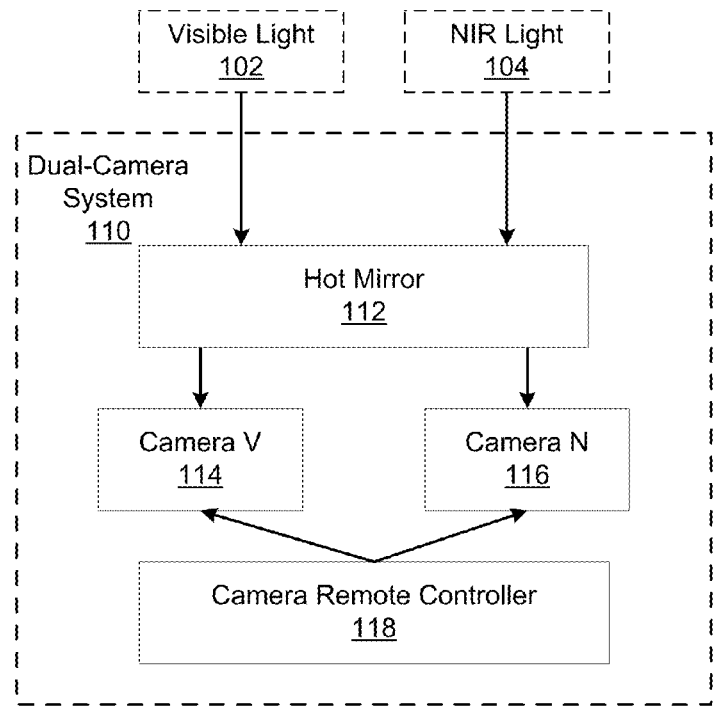
FIG. 2A shows a block diagram of the dual-camera system shown in FIG. 1.
Figure 2B:
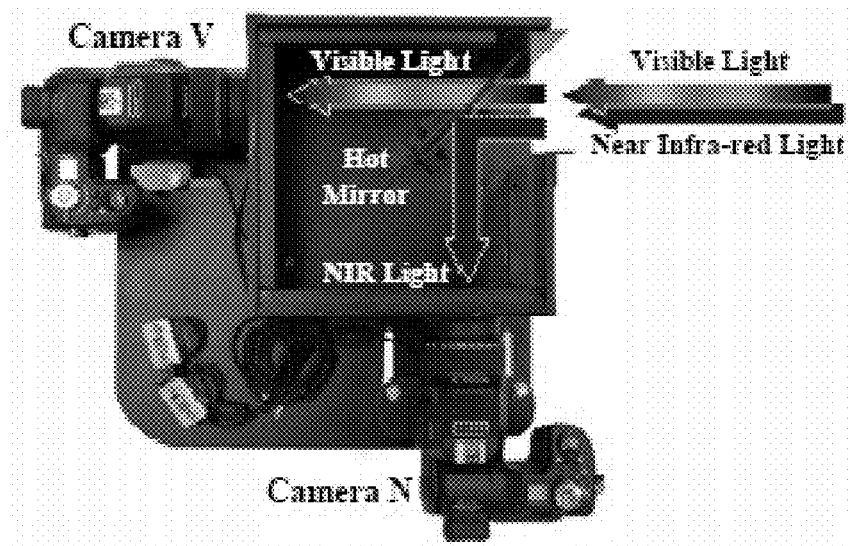
FIG. 2B shows a model of the dual-camera system shown in FIG. 2A.

FIG. 2A shows a block diagram of the dual-camera system 110 for capturing both visible and NIR images of the same scene simultaneously. FIG. 2B shows a model of the dual-camera system 110 illustrated in FIG. 2A. The dual-camera system 110 illustrated in FIG. 2A includes a digital camera V 114, a digital camera N 116, a hot mirror 112 and a camera remote controller 118. The camera V 114 is configured to receive visible light 102 and capture visible light images of a scene. The camera N 116 is configured to receive NIR light 104 and capture NIR images of the same scene simultaneously. The hot mirror 112 is a specialized dielectric mirror which can reflect NIR light when natural light arrives at a certain angle. In one embodiment, the hot mirror 112 is a 45° dielectric mirror, which can reflect NIR light with angle of incidence of 45° but does not block any visible light. The camera remote controller 118 is configured to trigger the camera V 114 and camera N 116 at the same time. The dual-camera system 110 is further configured to optically align the two cameras 114 and 116. In one embodiment, the cameras 114 and 116 share the same camera settings, such as focal length and aperture size, to guarantee the geometric alignment of the image pair. The two cameras 114 and 116 do not need to use the same shutter speed, because digital cameras designed to be less sensitive to NIR may require a slightly longer exposure. Other embodiments may use one camera to capture a pair of visible light image and its corresponding NIR image, such as camera using Bayer filter.

Generally, an NIR image captured by a digital camera (without color filtering) is a red-green-blue (RGB) color image and looks reddish since NIR light is just adjacent to red light. The hot mirror 116 filters the natural light coming from the scene such that the NIR light captured by the camera N 116 is almost monochromatic and does not contain any color information. In one embodiment, the NIR image from camera N 116 is converted from RGB color space to hue-saturation-value (HSV) color space and only the V-channel is used. This is to guarantee that the NIR image is monochromatic. Any known RGB-to-HSV conversion method may be used in the invention.

Similarly, the image captured by the camera V 114 is an RGB picture. The RGB image captured by the camera V 114 needs to be pre-processed to contain similar monochromatic information. In one embodiment, the RGB image from the camera V 114 is converted from RGB color space to HSV color space and only the V-channel is used for the photo quality enhancement process described below. To simplify the description of an embodiment, the pre-processed visible light image using the V channel information is referred to as "visible-V image".

Figure 3A:
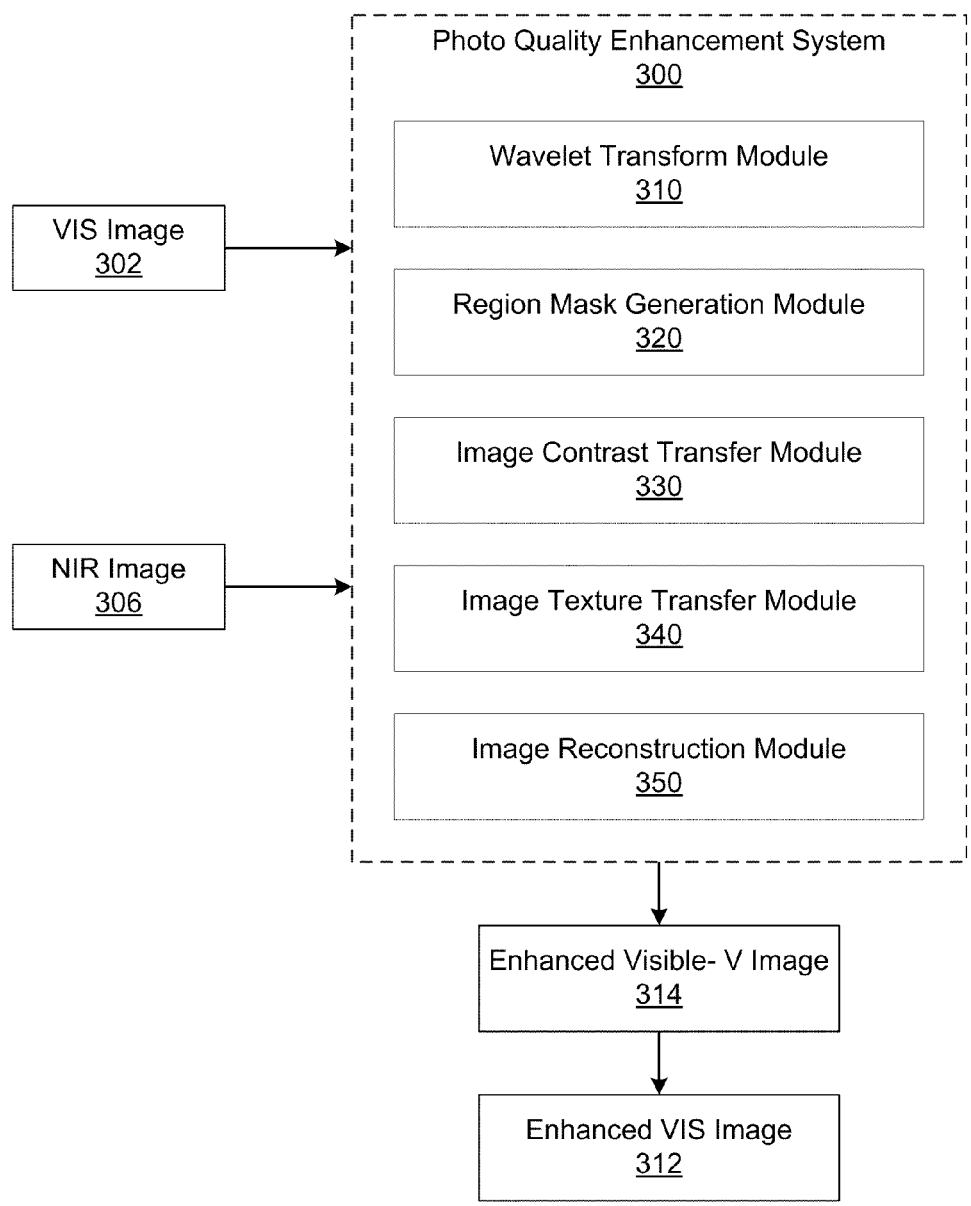
FIG. 3A shows functional modules of the photo quality enhancement system shown in FIG. 1.

FIG. 3A shows functional modules of a photo quality enhancement system 300. In one embodiment, the photo quality enhancement system 300 includes a wavelet transform module 310, a region mask generation module 320, an image contrast transfer module 330, an image texture transfer module 340 and an image reconstruction module 350. The photo quality enhancement system 300 receives a visible light image 302 and a NIR image 306 corresponding to the visible light image 302. The visible light image 302 and the NIR image 306 are further processed by the functional modules 310-350 to generate an enhanced visible-V image 314 and finally an enhanced visible light image 312.

To guide the photo quality enhancement process, the photo quality enhancement system 300 makes use of the statistical properties shared by NIR images, visible light images and long infra-red (LIR) images of natural scenes. Generally, the gradient histograms of natural images follow a generalized Laplace distribution which can be expressed as equation (1) below:

$$P(x) = k \cdot e^{-|x/s|\alpha} \quad (1)$$

NIR images share similar statistical properties described in equation (1). It is also noted that wavelet coefficients of LIR, where the wavelength lies in 4000-120000 nm range, can also be well fitted with the Laplacian curve described in equation (1). The photo quality enhancement system 300 uses gradient magnitude and wavelet coefficients of the visible-V image 304 and NIR image 306 for enhancing the photo quality of the visible image 302.

The wavelet transform module 310 is configured to apply a wavelet transform to the visible-V image 304 and the NIR image 306. In one embodiment, the wavelet transform module 310 applies a Haar wavelet transform to decompose the visible-V image 304 into a low frequency subband and multiple high frequency subbands. For example, the visible-V image 304 is decomposed into one low frequency subband and three high frequency subbands in horizontal, vertical and diagonal directions. Each pixel in a subband has a wavelet coefficient. Similarly, the wavelet transform module 310 applies a Haar wavelet transform to decompose the NIR image 306 into a low frequency subband and multiple high frequency subbands in horizontal, vertical and diagonal directions. The low frequency subband is also called the average subband. Other embodiments can use other types of wavelet transforms.

The region mask generation module 320 is configured to compute a weighted region mask from the visible light image 302. A weighted region mask of a visible light image indicates areas of the visible light image to be enhanced. The weighted region mask is used as a mask for contrast and texture transfer processes by the image contrast and texture transfer modules 330 and 340. Regions of a visible light image that suffer a loss of image details are typically too bright or too dark. In one embodiment, the region mask generation module 320 calculates the weighted region mask from the visible light image 302 based on the saturation and brightness values of the visible light image 302.

Specifically, the weighted region mask can be calculated using the equation (2) below:

$$W_s = 1 - e^{-p_e|s-1|}, \quad p_s \in [0, 1], s \in [0, 1] \quad (2)$$
$$W_v = 1 - e^{-p_v|v-0.5|}, \quad p_v \in [0, 1], v \in [0, 1]$$
$$W = W_s \cdot W_v$$

where Ws denotes weight mask of saturation and Wv denotes weighted mask of brightness, and W denote the final weighted region mask indicating areas to be enhanced. Symbols s and v represents the saturation and brightness value of the visible light image 302, respectively, and $P_s$ and $P_v$ denote the corresponding probability that s and v appear in the visible light image 302. $P_s$ and $P_v$ can be obtained from the normalized histograms of channels S (saturation) and V (value). $P_s$ and $P_v$ indicate that the pixels to be enhanced should distribute over large areas, rather than in small regions because enhancing large areas while ignoring small regions usually achieves better perceptual quality.

A higher value in W means more information needs to be transferred from the NIR image 306 to the visible light image 302 for the enhancement. To reduce noise, the region mask generation module 320 is further configured to apply a Gaussian blurring on W before W being used by other modules of the photo quality enhancement system 300. One advantage of the invention is that the region mask generation module 310 calculates the weighted region mask W of the visible light image 302 adaptively and fully automatically without requiring any thresholds.

Turning now to the image contrast transfer module 330, the contrast transfer module 330 is configured to transfer contrast information from the NIR image 306 to the visible light image 302 using histogram matching in gradient magnitude. The contrast transfer module 330 is configured to calculate the histograms of the visible-V image 304 and NIR image 306 for both gradient and wavelet coefficients in horizontal, vertical and diagonal directions. In one embodiment, the contrast transfer module 330 calculates the histograms based on the logarithm of the actual and normalized image pixel values of the visible-V image 304 and the NIR image 306. Generally, the histogram matching problem can be simply defined as: given an image I and a target histogram h(z), the problem is to find a new image J by transforming I, so as to make histogram of J be as same as h. The problem can be solved by using the cumulative distribution function (CDF) of i(z), $f_I$ defined as $f_I(x)=\int_0^x i(z)dz$, where x is intensity pixel value, and i(z) is the histogram of image I. The CDF of h is defined similarly. The desired image J can be obtained using the equation (3) below:

$$J_{ij}=f_H^{-1}(f_I(I_{ij})), \quad (3)$$

where $I_{ij}$ and $J_{ij}$ denote each pixel intensity in image I and image J.

The brightness contrast of a visible light image is affected by environment illumination, as well as object shape and texture in the scene. Therefore, the brightness map of an image should change smoothly while preserving major features such as strong edges. To achieve a smooth brightness map of a visible light image and its corresponding NIR image, the image contrast transfer module 330 uses bilateral filtering to obtain a large-scale layer and a detail layer from each of the visible image and the corresponding NIR image. Specifically, the image contrast transfer module 310 obtains an average of the subbands of the visible-V image after wavelet transform. Similarly, the image contrast transfer module 310 obtains the average subband of the NIR image after wavelet transform. The image contrast transfer module 330 decomposes the visible-V image represented by the average subband into a large-scale layer and a details layer using the equation (4a) below. Similar operations are applied to the NIR image using the equation (4b) below.

$$V_L = bf(V), V_D = V - V_L, \quad (4a)$$

$$N_L = bf(N), N_D = N - N_L, \quad (4b)$$

where $V_L$ and $N_L$ are large-scale layers of the visible image and the NIR image, respectively, and $V_D$ and $N_D$ are corresponding detail layers after bilateral filtering. The bf(·) is the bilateral filter used by equation (4). Any image bilateral filter and filtering schemes are available to the embodiments of the invention. The image contrast transfer module 330 uses the large-scale layers $V_L$ and $N_L$ as a brightness map.

In one embodiment, the image contrast transfer module 330 implements a gradient magnitude matching method to transfer contrast from the NIR image 306 to the visible light image 302. The gradient magnitude matching method matches the histogram of brightness gradient magnitude (instead of brightness intensity) to maintain smoothness of the transferred brightness map using the following equations (5)-(7). Equation (5) defines the gradient magnitudes, $V_G$ and $N_G$, of the large-scale layer, $V_L$ and $N_L$, of the visible light image 302 and the corresponding NIR image 306, respectively below:

$$V_G = \sqrt{V_{Gx}^2 + V_{Gy}^2} = \sqrt{\left(\frac{\partial V_L}{\partial x}\right)^2 + \left(\frac{\partial V_L}{\partial y}\right)^2} \quad (5)$$

$$N_G = \sqrt{N_{Gx}^2 + N_{Gy}^2} = \sqrt{\left(\frac{\partial N_L}{\partial x}\right)^2 + \left(\frac{\partial N_L}{\partial y}\right)^2},$$

The gradient magnitude histogram of a NIR image can be well fitted with a generalized Laplacian curve as discussed above. Because $N_L$ is a smoothed version of the NIR image, its gradient magnitude $N_G$ also has same statistical property. Let l denote the Laplacian curve that can fit histogram of $N_G$. Instead of matching histogram of $V_G$ with histogram of $N_G$ directly, the image contrast transfer module 330 uses l as the target histogram to produce a smoother and noise-free distribution transfer. In this case, the functions $f_I$ and $f_J$ in equation (3) are the cumulative distribution functions of l. Let $V_{G'}$ denote the histogram matching result, the image contrast transfer module 330 can easily compute new gradients by scaling $V_{Gx}$ and $V_{Gy}$ along their original directions using equation (6) below:

$$V_{G'_x} = \frac{V_{G'}}{V_G} \cdot V_{G_x} \quad (6)$$

$$V_{G'_y} = \frac{V_{G'}}{V_G} \cdot V_{G_y},$$

From $V_{G_x}$ and $V_{G_y}$, the image contrast transfer module 330 reconstructs a new large-scale brightness map $V_{L'}$ using a large-scale brightness map reconstruction scheme. This reconstruction scheme reverses the gradient (i.e., image derivative) calculation by integrating the gradients back into pixel values. Any known reconstruction method may be used, such as the Poisson solver. The final contrast transferred V' is obtained by blending enhanced brightness map and its original version V together using alpha-blending described in equation (7) below:

$$V' = W \cdot (V_L + V_D) + (1 - W) \cdot V, \quad (7)$$

where the weighted map W calculated by the region mask generation module 320 is used as the alpha channel and |·| denotes pixel-wise multiplication.

Other embodiments of the image contrast transfer module 330 include histogram matching which matches the intensity histogram of $V_L$ with $N_L$ to transfer intensity distribution. Histogram matching is easy and efficient, but the histogram matching may blindly alter pixel values with possibility of destroy illumination consistency. The image contrast transfer module 330 may apply the gradient constraint to improve the matching result.

Another embodiment of the image contrast transfer module 330 uses histogram matching with gradient constraint. To maintain illumination consistency, the image contrast transfer module 330 checks the gradient direction of the altered brightness map pixel by pixel. Once the image contrast transfer module 330 finds the gradient direction that is reversed or changed too much from the original brightness map, the image contrast transfer module 330 forces them to be zero. After applying the gradient constraint, the enhanced result looks more natural compared with histogram matching method described above. But in some cases, where gradients change abruptly along their original directions due to the histogram matching step, the gradient constraint may still yield less desired visual quality. Compared with histogram matching and histogram matching with gradient constraint methods, the gradient magnitude matching method naturally maintains illumination consistency and achieves the best result among these three methods.

Turning now to the image texture transfer module 340, the image texture transfer module 340 is configured to exploit the rich texture information in high frequency subbands after wavelet transform in both the visible-V image 304 and the NIR image 306 for enhancing the photo quality of the visible light image 302. After applying the Haar wavelet transformation to the visible-V image 304 and NIR image 306, the high frequency subbands in horizontal, vertical, and diagonal directions in both images contain rich texture information. The image texture transfer module 340 is configured to use alpha blending to combine corresponding subbands of both images 304 and 306 using the equation (8) below:

$$VH'=W\cdot NH+(1\cdot W)\cdot VH. \quad (8)$$

Other subbands VV' and VD' are obtained similarly. The weighted map W calculated by the region mask generation module 320 is used similarly as in equation (7) for the alpha blending. The new subbands VH', VV' and VD' not only inherit texture details from the visible light image 302, but are also enhanced by rich high frequency details from NIR image 306. By transferring high frequency details from the NIR image 306 to the visible light image 302, those lost textures in the visible light image 302 are successfully recovered, and those weak textures are also reinforced greatly.

The image reconstruction module 350 is configured to reconstruct the enhanced visible light image 312. In the embodiment, the reconstruction module 350 applies inverse Haar wavelet transform to the subband V' (representing transferred contrast) and subbands VH', VV' and VD' (representing transferred texture) to get an enhanced visible-V image 314 in HSV color space. The enhanced visible-V image 314 is then converted to the enhanced visible light image 312 in RGB color space.

Figure 3B:
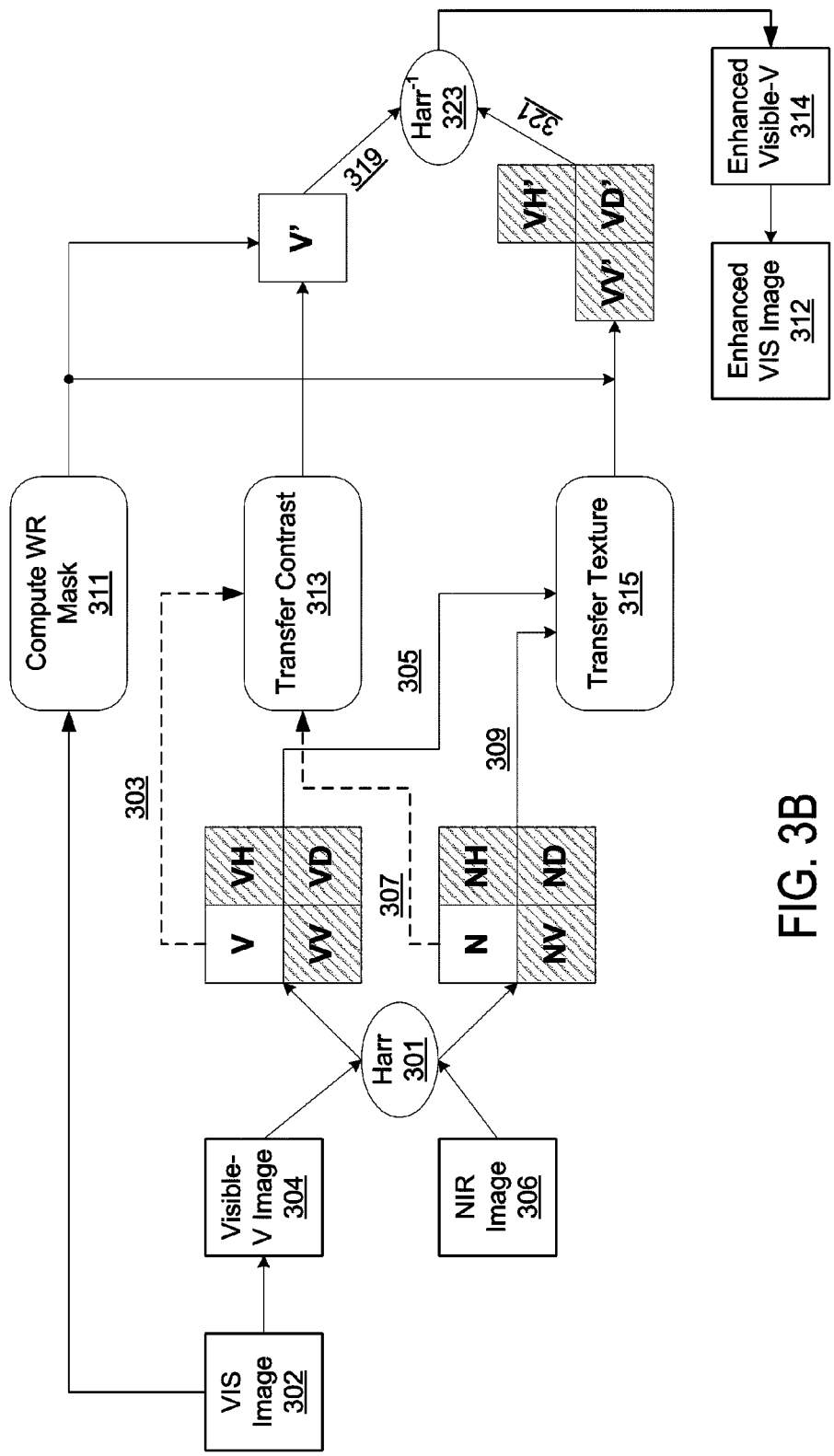
FIG. 3B is a block flow diagram of the photo quality enhancement system shown in FIG. 1.

FIG. 3B is a flow diagram of the photo quality enhancement system 300 described with reference to FIG. 3A. Initially, a pair of images, the visible light image 302 and its corresponding NIR image 306, are received by the enhancement system 300. The region mask generation module 320 calculates the weighted region mask 311 from the visible light image 302 based on the saturation and brightness values of the visible light image 302. The visible-V image 304 is a channel-V image of the visible light image 302 after RGB-to-HSV color transformation. The wavelet transform module 310 applies Haar wavelet filter 301 to both the visible-V image 304 and NIR image 306 and decomposes both images into their lower frequency subband (e.g., V and N) and the higher frequency subbands in horizontal, vertical and diagonal directions (e.g., VH, VV and VD and NH, NV and ND). The contrast information from the NIR image 306 is represented by its lower frequency subband coefficients after Haar wavelet transform, and the contrast information of the visible-V image 304 is represented by the lower frequency subband coefficients after Haar wavelet transform. Similarly, the texture information from both images is represented by their higher frequency subband coefficients after Haar wavelet transform.

The Image contrast transfer module 330 takes the contrast information of the visible-V image 304 and the NIR image 306 (e.g., subband V 303 and subband N 307) to generate the contrast transferred subband V' 319. The image texture transfer module 340 takes the texture information of the visible-V image 304 and the NIR image 306 (e.g., VH, VV and VD and NH, NV and ND) to generate the texture transferred subbands VH', VV' and VD'. The contrast transfer and texture transfer processes are guided by the weighted region mask 317. The image reconstruction module 350 applies the inverse Haar wavelet transform 323 to the subbands V' and VH', VV' and VD' and generates an enhanced visible-V image 314. The enhanced visible light image 312 is generated from the enhanced visible-V image 314.

Figure 4:
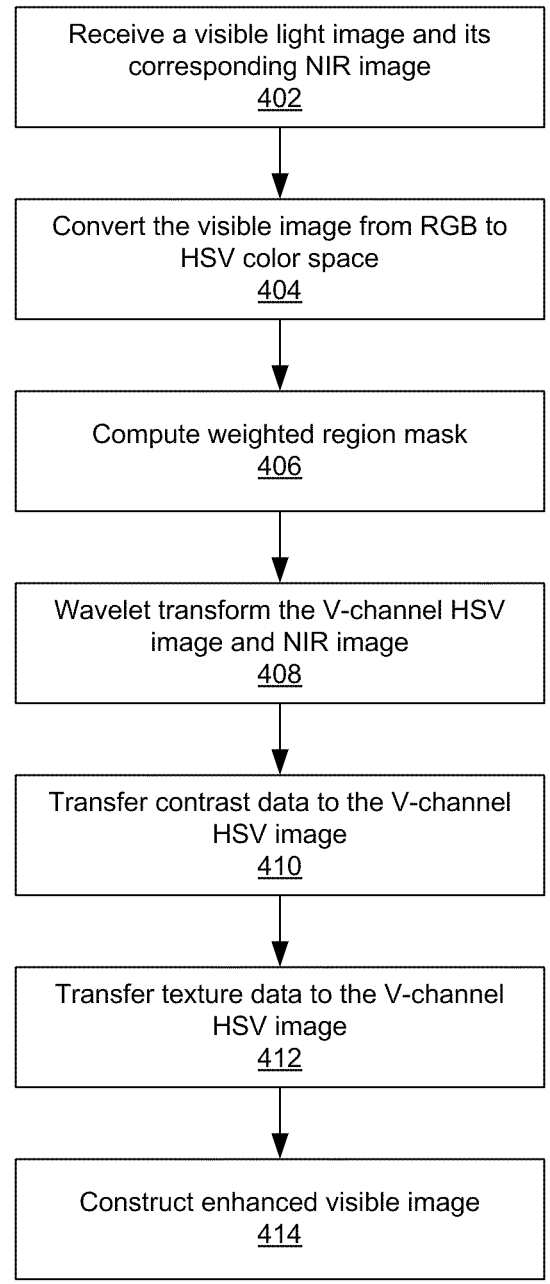
FIG. 4 is a flow diagram of a method for enhancing photo quality using near infra-red images, in accordance with an embodiment of the invention.

FIG. 4 is a flow diagram of a method for enhancing photo quality using near infra-red images, in accordance with an embodiment of the invention. Initially, the photo quality enhancement system 300 receives 402 a visible light image and its corresponding NIR image. The system 300 converts 404 the visible light image to a visible-V image using color space transformation and intensity values of the color-transformed image. The region mask generation module 320 of the system 300 computes 406 a weighted region mask from the visible image to guide contrast and texture information transformation. The wavelet transform module 310 of the system 300 wavelet transforms 408 the visible-V and NIR images. The image contrast transfer module 330 of the system 300 transfers 410 the contrast information of the NIR image to the visible-V image. The image texture transfer module 340 of the system 300 transfers 412 the texture information of the NIR image to the visible-V image. The image reconstruction module 350 of the system 300 applies inverse wavelet transform to the contrast and texture transferred subbands of the visible-V image and constructs 414 an enhanced visible-V image and an enhanced visible light image.

Figure 5A:
FIG. 5 is an illustration of result from the photo quality enhancement, in accordance with an embodiment of the invention.
Figure 5B:
Figure 5C:

To demonstrate the strength of the photo quality enhancement by the invention, FIG. 5A-5C illustrate the result from the photo quality enhancement. FIG. 5A is an improperly exposed visible light image taken under a high dynamic range environment for the purpose of illustration. The improper exposure of the visible light image in FIG. 5A includes over-exposure and under-exposure of some regions in the image. FIG. 5B is the corresponding NIR image of the visible picture in FIG. 5A. It can be seen from the NIR image in FIG. 5B that in outdoor daylight, some objects, such as tree leaves, reflect NIR light strongly and look bright with texture details even in shaded areas. Such features in the NIR image are useful for enhancing the visible light image in FIG. 5A. The dual-camera system 110 captures the visible light image shown in FIG. 5A and its corresponding NIR image in FIG. 5B and the photo quality enhancement system 300 enhances the visual quality of the visible light image in FIG. 5A. As described above, the photo quality enhancement system 300 automatically detects the under- and over-exposed regions in the visible light image in FIG. 5A and adaptively adjusts the contrast and enriches the texture details of the visible light image in FIG. 5A using the corresponding contrast and texture information from the NIR image in FIG. 5B. The photo quality enhancement is shown in FIG. 5C, which clearly shows the details invisible in FIG. 5A such as the tree leaves near the far right end of the picture.

The methods and techniques described herein can be performed by a computer program product and/or on a computer-implemented system. For example, to perform the steps described, appropriate modules are designed to implement the method in software, hardware, firmware, or a combination thereof. The invention therefore encompasses a system, such as a computer system installed with appropriate software, that is adapted to perform these techniques for creating soft shadows. Similarly, the invention includes a computer program product comprising a computer-readable medium containing computer program code for performing these techniques for creating soft shadows, and specifically for determining an extent to which an area light source is occluded at a particular shading point in an image.

The foregoing description of the embodiments of the invention has been presented for the purposes of illustration and description. It is not intended to be exhaustive or to limit the invention to the precise forms disclosed. Persons skilled in the relevant art can appreciate that many modifications and variations are possible in light of the above teaching. It is therefore intended that the scope of the invention be limited not by this detailed description, but rather by the claims appended hereto.

What is claimed is:

1. A computer-implemented method for enhancing the visual quality of a visible light image using its corresponding near infra-red image, the method comprising:
   computing a weighted region mask from the visible light image, the weighted region mask indicating areas of the visible light image to be enhanced and the extent of enhancement;
   wavelet transforming the visible light image and the near infra-red image into a plurality of low frequency and high frequency subbands;
   computing a contrast transferred subband from the low frequency subband of the visible light image and the low frequency subband of the near infra-red image guided by the weighted region mask;
   computing texture transferred subbands from the high frequency subbands of the visible light image and the high frequency subbands of the near infra-red image guided by the weighted region mask; and
   generating a quality enhanced visible light image from the contrast transferred subband and the texture transferred subbands.

2. The method of claim 1, further comprising capturing the visible light image and its corresponding near infra-red image simultaneously, wherein each pixel of the visible light image is aligned with the collocated pixel of the near infra-red image.

3. The method of claim 1, wherein calculating the weighted region mask comprises computing the weighted region mask based on saturation and brightness values of the visible light image.

4. The method of claim 1, wherein wavelet transforming the visible light image comprises:
   converting the visible light image from a RGB color space to a HSV color space;
   generating a channel-V image from the visible light image in HSV color space, the channel-V image using the intensity values of the visible light image in HSV color space; and
   decomposing the channel-V image into a low frequency subband and high subband and the texture transferred subbands.

5. The method of claim 4, wherein wavelet transforming the visible light image further comprises calculating histograms of gradient magnitude and histogram of wavelet coefficients of the high frequency subbands of the channel-V image.

6. The method of claim 1, wherein wavelet transforming the near infra-red image comprises decomposing the near infra-red image into a low frequency subband and high frequency subbands in horizontal, vertical and diagonal directions.

7. The method of claim 1, wherein wavelet transforming the near infra-red image further comprises calculating histograms of gradient magnitude and histogram of wavelet coefficients of the high frequency subbands of the near infra-red image.

8. The method of claim 1, wherein computing the contrast transferred subband comprises:
   applying bilateral filtering to the average subband of the visible light image to generate a large-scale layer of the visible light image representing the smoothed brightness of the visible light image; and
   applying bilateral filtering to the average subband of the near infra-red image to generate a large-scale layer of the near infra-red image representing the smoothed brightness of the near infra-red image.

9. The method of claim 1, wherein computing the contrast transferred subband further comprises:
   generating a detail layer of the visible image representing the smoothed texture of the visible light image; and
   generating a detail layer of the near infra-red image representing the smoothed texture of the near infra-red image.

10. The method of claim 1, wherein computing the contrast transferred subband further comprises matching histogram of gradient magnitude of the visible light image with histogram of gradient magnitude of the corresponding near infra-red image.

11. The method of claim 10, further comprises generating a contrast transferred subband using the matching result guided by the weighted region mask.

12. The method of claim 1, wherein computing texture transferred subbands comprises combining the high-frequency subbands of the visible image and the corresponding near infra-red image based on the weighted region map.

13. A computer program product for enhancing the visual quality of a visible light image using its corresponding near infra-red image, the computer program product comprising a non-transitory computer-readable storage medium containing computer program code for performing the operations:
   computing a weighted region mask from the visible light image, the weighted region mask indicating areas of the visible light image to be enhanced and the extent of enhancement;
   wavelet transforming the visible light image and the near infra-red image into a plurality of low frequency and high frequency subbands;
   computing a contrast transferred subband from the low frequency subband of the visible light image and the low frequency subband of the near infra-red image guided by the weighted region mask;
   computing texture transferred subbands from the high frequency subbands of the visible light image and the high frequency subbands of the near infra-red image guided by the weighted region mask; and
   generating a quality enhanced visible light image from the contrast transferred subband and the texture transferred subbands.

14. The computer program product of claim 13, further comprising computer program code for capturing the visible light image and its corresponding near infra-red image simultaneously, wherein each pixel of the visible light image is aligned with the collocated pixel of the near infra-red image.

15. The computer program product of claim 13, wherein the computer program code for calculating the weighted region mask comprises computer program code for computing the weighted region mask based on saturation and brightness values of the visible light image.

16. The computer program product of claim 13, wherein the computer program code for wavelet transforming the visible light image comprises computer program code for:
converting the visible light image from a RGB color space to a HSV color space;
generating a channel-V image from the visible light image in HSV color space, the channel-V image using the intensity values of the visible light image in HSV color space; and
decomposing the channel-V image into a low frequency subband and high subband and the texture transferred subbands.

17. The computer program product of claim 16, wherein the computer program code for wavelet transforming the visible light image further comprises computer program code for calculating histograms of gradient magnitude and histogram of wavelet coefficients of the high frequency subbands of the channel-V image.

18. The computer program product of claim 13, wherein the computer program code for wavelet transforming the near infra-red image comprises computer program code for decomposing the near infra-red image into a low frequency subband and high frequency subbands in horizontal, vertical and diagonal directions.

19. The computer program product of claim 13, wherein the computer program code for wavelet transforming the near infra-red image further comprises computer program code for calculating histograms of gradient magnitude and histogram of wavelet coefficients of the high frequency subbands of the near infra-red image.

20. The computer program product of claim 13, wherein the computer program code for computing the contrast transferred subband comprises computer program code for:
applying bilateral filtering to the average subband of the visible light image to generate a large-scale layer of the visible light image representing the smoothed brightness of the visible light image; and
applying bilateral filtering to the average subband of the near infra-red image to generate a large-scale layer of the near infra-red image representing the smoothed brightness of the near infra-red image.

21. The computer program product of claim 13, wherein the computer program code for computing the contrast transferred subband further comprises computer program code for:
generating a detail layer of the visible light image representing the smoothed texture of the visible image; and
generating a detail layer of the near infra-red image representing the smoothed texture of the near infra-red image.

22. The computer program product of claim 13, wherein the computer program code for computing the contrast transferred subband further comprises computer program code for matching histogram of gradient magnitude of the visible light image with histogram of gradient magnitude of the corresponding near infra-red image guided by the weighted region mask.

23. The computer program product of claim 22, further comprises computer program code for generating a contrast transferred subband using the matching result.

24. The computer program product of claim 13, wherein computer program code for computing texture transferred subbands comprises computer program code for combining the high-frequency subbands of the visible light image and the corresponding near infra-red image guided by the weighted region mask.

25. A computer system for enhancing a visual quality of a visible light image using its corresponding near infra-red image, the computer system comprising:
a dual-camera sub-system configured to capture the visible light image and its corresponding near infra-red image simultaneously, the dual-camera sub-system comprising:
a first camera configured to capture the visible light image of a scene;
a second camera configured to capture the corresponding near infra-red image of the scene;
a hot mirror configured to filter natural light received by the dual-camera sub-system; and
an optical remote controller configured to trigger the first camera and the second camera simultaneously; and
a visual quality enhancement sub-system configured to enhance the visual quality of the visible light image using its corresponding near infra-red image, the visual quality enhancement sub-system coupled to the dual-camera sub-system.

26. The computer system of claim 25, wherein the hot mirror is further configured to reflect near infra-red light of the natural light.

27. The computer system of claim 25, wherein the hot mirror is a 45° dielectric mirror, configured to reflect near infra-red light with an angle of 45°.

28. The computer system of claim 27, wherein the dielectric mirror is further configured not to block any visible light of the natural light.

29. The computer system of claim 25, wherein the optical remote controller is further configured to set up the first camera and second camera optically aligned.

30. The computer system of claim 25, wherein the optical remote controller is further configured to use a camera setting shared by the first camera and the second camera.

31. The method of claim 11, wherein combining the high-frequency subbands of the visible image and the corresponding near infra-red image comprises alpha blending the high-frequency subbands guided by the weighted region mask.

* * * * *